(12) United States Patent
Jeon (10) Patent No.: US 11,245,155 B2
(45) Date of Patent: Feb. 8, 2022

(54) BATTERY MODULE FOR A VEHICLE

(71) Applicants: HYUNDAI MOTOR COMPANY, Seoul (KR); KIA MOTORS CORPORATION, Seoul (KR)

(72) Inventor: Yoon Cheol Jeon, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 189 days.

(21) Appl. No.: 16/656,110

(22) Filed: Oct. 17, 2019

(65) Prior Publication Data

US 2020/0350538 A1 Nov. 5, 2020

(30) Foreign Application Priority Data

May 3, 2019 (KR) .................. 10-2019-0052483

(51) Int. Cl.
*H01M 50/342* (2021.01)
*H01M 10/6554* (2014.01)
*H01M 50/20* (2021.01)
*H01M 50/24* (2021.01)

(52) U.S. Cl.
CPC ..... *H01M 50/342* (2021.01); *H01M 10/6554* (2015.04); *H01M 50/20* (2021.01); *H01M 50/24* (2021.01)

(58) Field of Classification Search
None
See application file for complete search history.

(56) References Cited

U.S. PATENT DOCUMENTS

| 9,634,295 | B2 | 4/2017 | Dube | |
|---|---|---|---|---|
| 2003/0017387 | A1* | 1/2003 | Marukawa | H01M 50/20 429/156 |
| 2018/0331398 | A1 | 11/2018 | Oh | |

FOREIGN PATENT DOCUMENTS

KR 20180124450 A 11/2018

\* cited by examiner

*Primary Examiner* — Wyatt P McConnell
(74) *Attorney, Agent, or Firm* — Lempia Summerfield Katz LLC (57) ABSTRACT

A battery module for a vehicle includes: a plurality of battery cells which are stacked; a first end plate located on an outer surface of the battery cell located on one outermost side among the plurality of battery cells; a second end plate located on an outer surface of the battery cell located on the other outermost side among the plurality of battery cells; and one or more support bars located between the first and second end plates. The one or more support bars connect the first and second end plates to each other, include an elastic body, and absorb a load generated when the plurality of battery cells is swollen.

8 Claims, 7 Drawing Sheets

BATTERY MODULE FOR A VEHICLE

CROSS REFERENCE TO RELATED APPLICATION

The present application claims priority to Korean Patent Application No. 10-2019-0052483, filed on May 3, 2019, the entire contents of which is incorporated herein for all purposes by this reference.

BACKGROUND

1. Technical Field

The present disclosure relates to a battery module for a vehicle, and more particularly, to a battery module for a vehicle capable of maintaining a surface pressure applied to a battery cell by absorbing a load generated when the battery cell is swollen.

2. Description of the Related Art

In a pouch-type battery cell or prismatic battery cell applied to an electric vehicle, cell swelling occurs due to charge/discharge or deterioration of the battery cell. In general, the pouch-type battery cell may obtain the maximum output and life when a constant pressure is applied thereto. To this end, a battery module is assembled in a form such that a constant pressure is applied to the battery cell by using end plates disposed on the front and the back of a plurality of battery cells and a support bar connecting the end plates to each other.

However, in the structure of the battery module described above, when cell swelling occurs due to charge/discharge or deterioration of the battery cell, pressure may be excessively applied to the battery cell. In such a case, a capacity of the battery cell may be reduced. Accordingly, it is necessary to develop a technique in which a constant pressure is applied to the battery cell even when the cell swelling occurs due to charge/discharge or deterioration of the battery cell.

The contents described as the related art have been provided only to assist in understanding the background of the present disclosure and should not be considered as corresponding to the related art known to those having ordinary skill in the art.

SUMMARY

An object of the present disclosure is to provide a battery module for a vehicle capable of maintaining a surface pressure applied to a battery cell by absorbing a load generated when the battery cell is swollen.

According to an embodiment of the present disclosure, a battery module for a vehicle includes: a plurality of battery cells which are stacked; a first end plate located on an outer surface of a first battery cell located on one outermost side among the plurality of battery cells; a second end plate located on an outer surface of a second battery cell located on the other outermost side among the plurality of battery cells; and one or more support bars located between the first and second end plates. The one or more support bars connect the first and second end plates to each other, include an elastic body, and absorb a load generated when the plurality of battery cells is swollen. The one or more support bars include a fixed support bar having a first support bar with one side connected to the first end plate and a first support bar head formed on the other side of the first support bar. The one or more support bars also include a movable support bar having a second support bar with the other side connected to the second end plate and a second support bar head formed on one side of the second support bar.

The battery module for a vehicle may further include a battery case in which the plurality of battery cells is mounted.

The first end plate may be coupled and fixed to the battery case.

The second end plate may be movable in a direction opposite to the first end plate when the plurality of battery cells is swollen.

The second support bar head may have an accommodation space formed therein and may have a cylindrical or polyprismatic cross section. A first penetrating portion protruding the first support bar may be formed on one surface of the second support bar head. A second penetrating portion may be formed on at least one of a front surface and a rear surface of the second support bar head.

A part of the elastic body and the fixed support bar is disposed in the accommodation space of the second support bar head. The elastic body absorbs a load generated when the plurality of battery cells is swollen.

The elastic body may be located between the first support bar head and one surface of the second support bar head and compressed as the movable support bar moves when the plurality of battery cells is swollen.

The battery module for a vehicle may further include a movable bracket coupled to the movable support bar and being movable as the movable support bar moves when the plurality of battery cells is swollen. The battery module may further include a fixed bracket being located over the movable bracket and fastened to the movable bracket to limit a movement of the movable bracket in a direction other than a direction in which the plurality of battery cells is swollen. The battery module may also include a pad disposed between the fixed bracket and the movable bracket and having a friction coefficient of a certain value or less.

The movable bracket may include a first coupling portion coupled to the movable support bar and a plurality of fastening portions fastened to the fixed bracket.

The fixed bracket may include a second coupling portion coupled to the battery case and a plurality of slits to which the plurality of fastening portions is fastened.

Each of the fastening portions may include a protruding portion protruding upward from a lower surface of the movable bracket and an extending portion bent at an end of the protruding portion and extending to the second end plate.

A height of the protruding portion may be greater than a thickness of the fixed bracket and a width of the extending portion may be formed to be smaller than a width of the respective slit.

DETAILED DESCRIPTION OF THE EMBODIMENTS

Hereinafter, a battery module for a vehicle according to various embodiments of the present disclosure is described with reference to the accompanying drawings.

Figure 1:
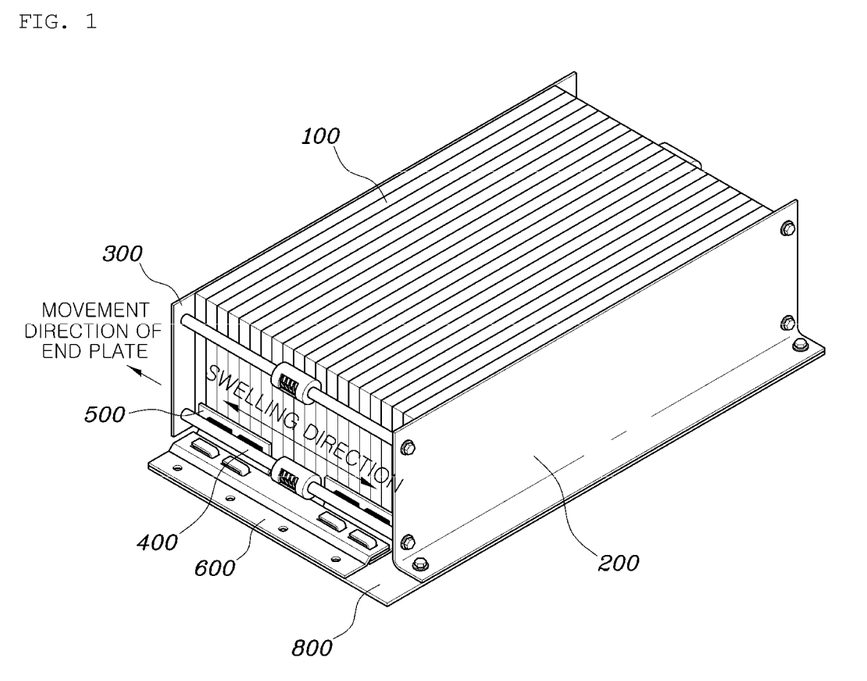
FIG. 1 is a perspective view showing a battery module for a vehicle according to an embodiment of the present disclosure.
Figure 2:
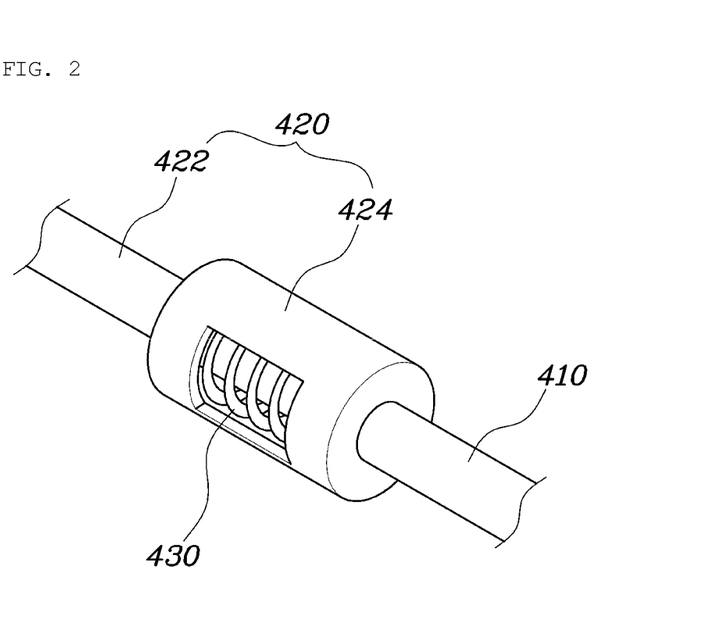
FIG. 2 is a perspective view showing a support bar of a battery module for a vehicle according to an embodiment of the present disclosure.
Figure 3:
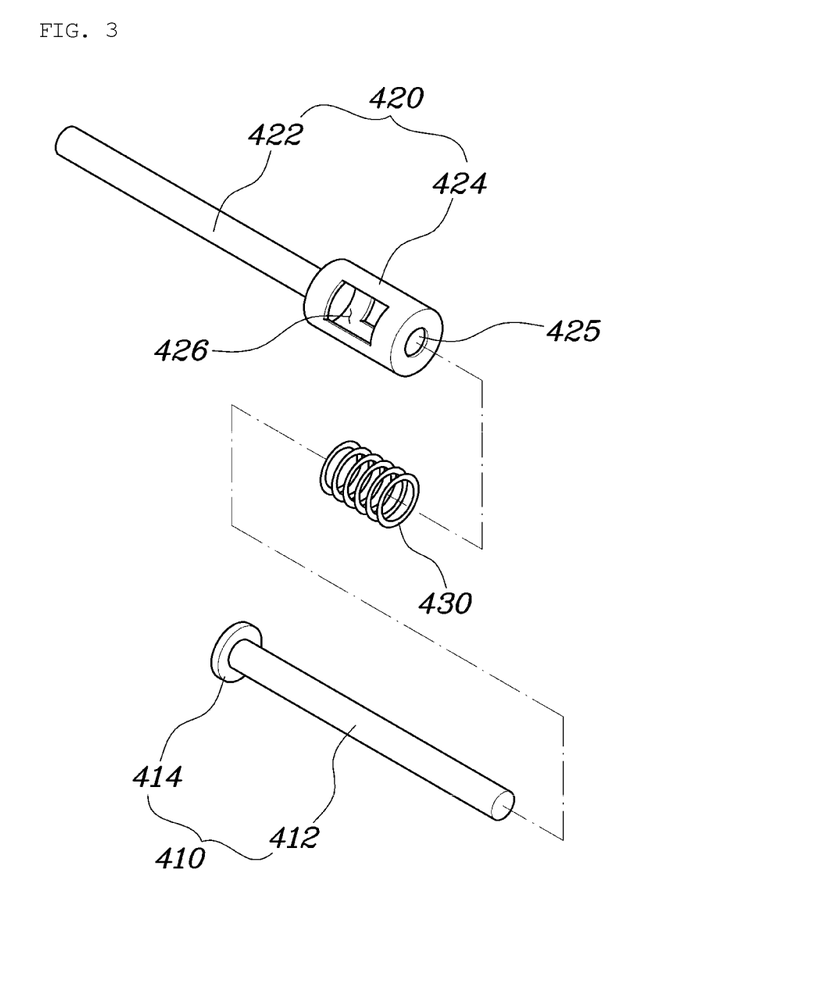
FIG. 3 is an exploded perspective view showing a support bar of a battery module for a vehicle according to an embodiment of the present disclosure.
Figure 4:
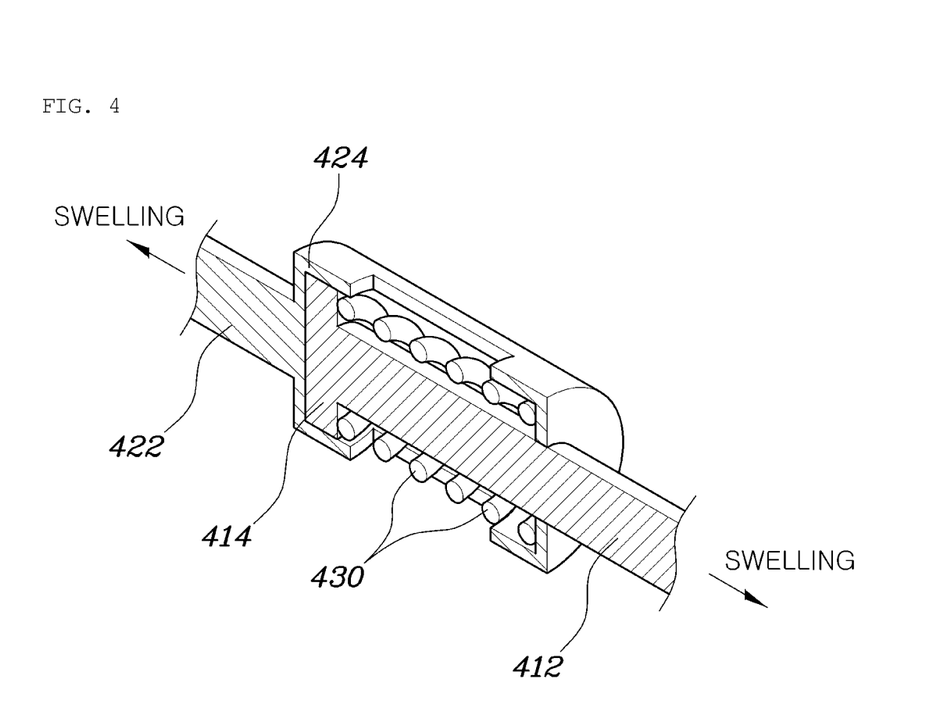
FIG. 4 is a cross-sectional view showing a support bar of a battery module for a vehicle according to an embodiment of the present disclosure.
Figure 5:
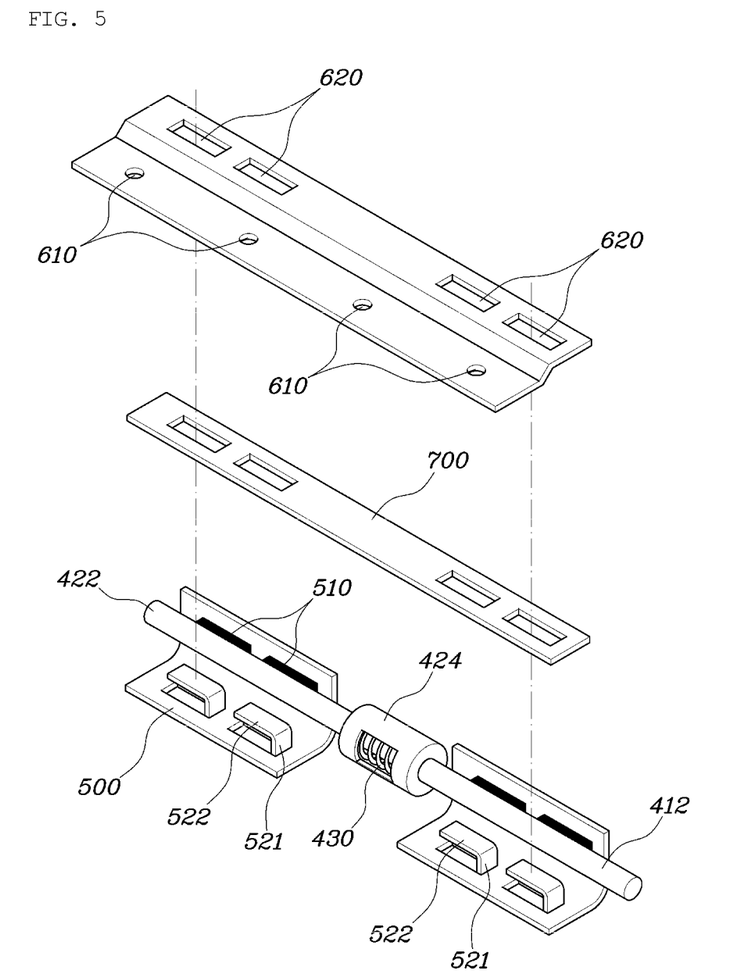
FIG. 5 is a view showing a fixed bracket, a movable bracket, and a pad of a battery module for a vehicle according to an embodiment of the present disclosure.
Figure 6:
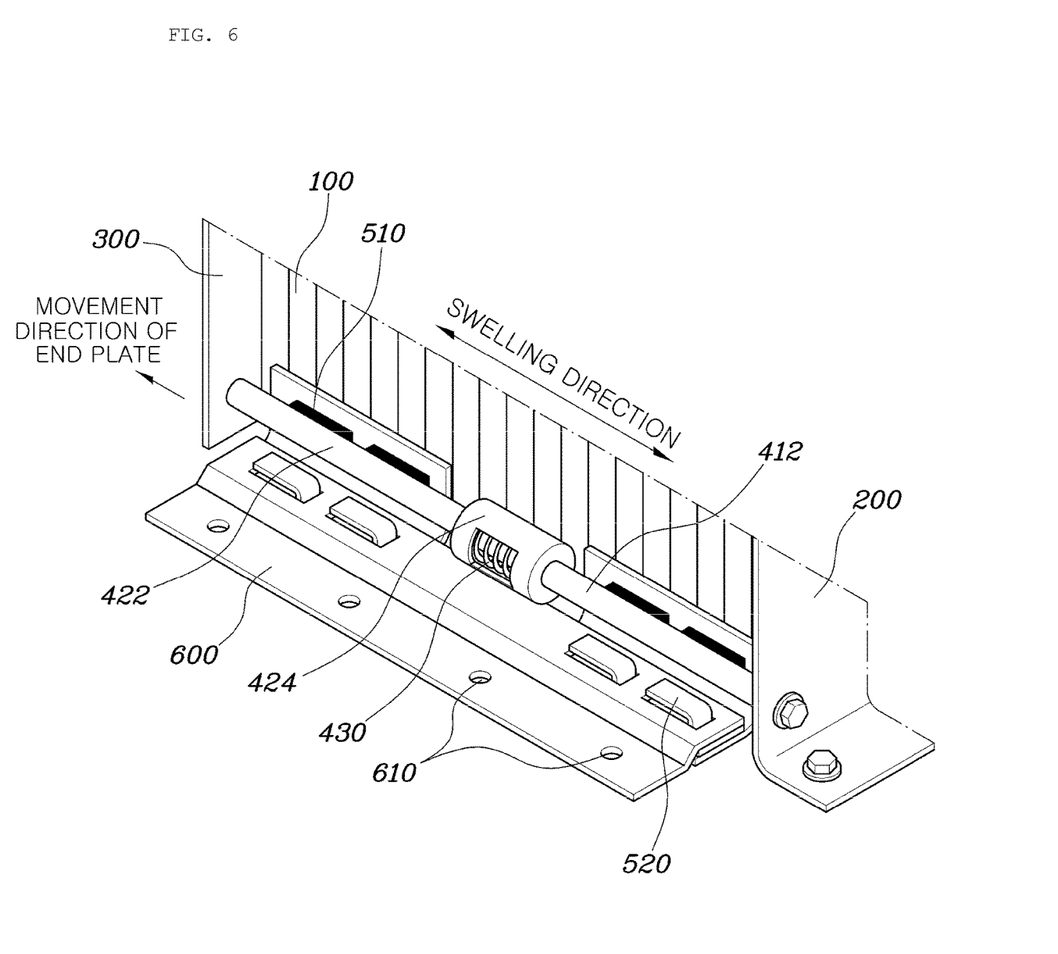
FIG. 6 is a view showing a movement of a movable bracket when a battery cell is swollen in a battery module for a vehicle according to an embodiment of the present disclosure.
Figure 7:
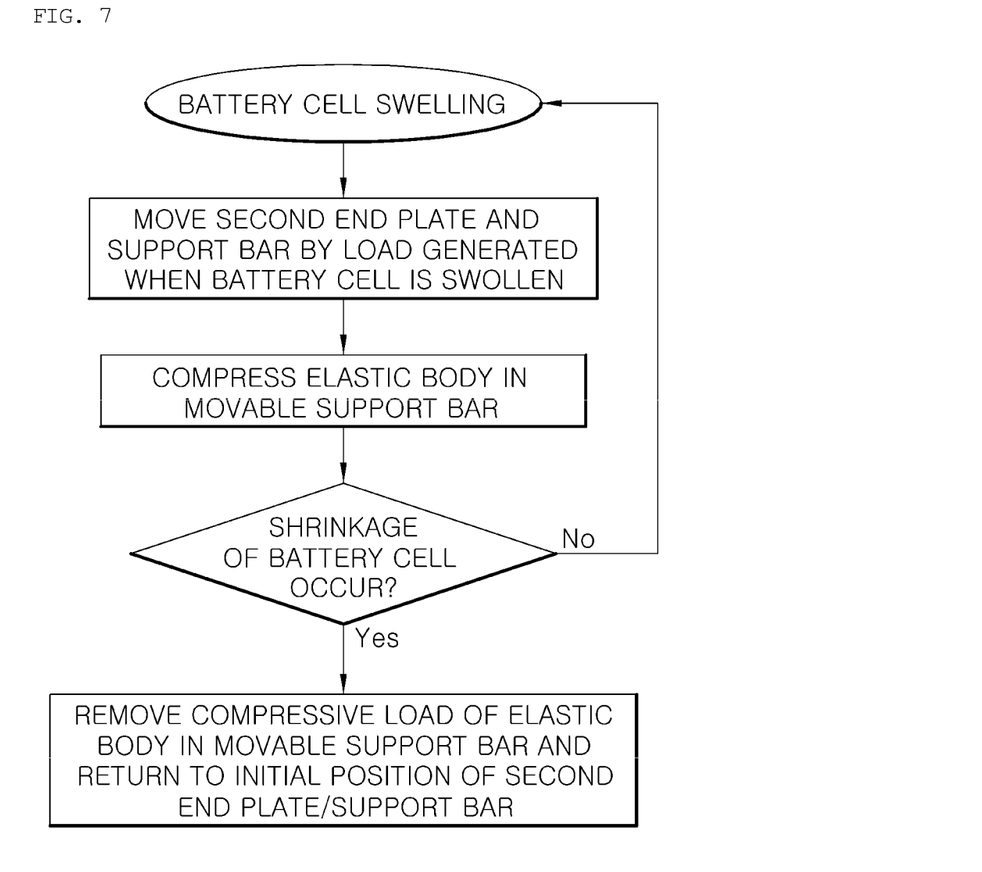
FIG. 7 is a flowchart showing an operation flow of a battery module for a vehicle according to an embodiment of the present disclosure.

FIG. 1 is a perspective view showing a battery module for a vehicle according to an embodiment of the present disclosure. FIG. 2 is a perspective view showing a support bar of a battery module for a vehicle according to an embodiment of the present disclosure. FIG. 3 is an exploded perspective view showing a support bar of a battery module for a vehicle according to an embodiment of the present disclosure. FIG. 4 is a cross-sectional view showing a support bar of a battery module for a vehicle according to an embodiment of the present disclosure. FIG. 5 is a view showing a fixed bracket, a movable bracket, and a pad of a battery module for a vehicle according to an embodiment of the present disclosure. FIG. 6 is a view a movement of a movable bracket when a battery cell is swollen, in a battery module for a vehicle according to an embodiment of the present disclosure. FIG. 7 is a flowchart showing an operation flow of a battery module for a vehicle according to an embodiment of the present disclosure.

As shown in FIGS. 1-6, a battery module for a vehicle according to an embodiment of the present disclosure may include a plurality of battery cells 100, a first end plate 200, a second end plate 300, and a support bar 400. The battery module may further include a movable bracket 500, a fixed bracket 600, a pad 700, and a battery case 800.

Specifically, the battery module for a vehicle according to an embodiment of the present disclosure may include the plurality of battery cells 100. Each of the battery cells 100 may be stacked while being in surface contact with each other. In this embodiment, the reason why each of the battery cells 100 is stacked to be in surface contact with each other is to apply a uniform surface pressure to each of the battery cells 100. According to the embodiment, a surface pressure pad may be inserted between each of the battery cells 100 in order to apply a uniform surface pressure to the battery cells 100.

The first endplate 200 is located on an outer surface of the battery cell, i.e., a first battery cell, located on one outermost side among the plurality of the battery cells 100. The first end plate 200 may support the battery cells 100. Furthermore, the first end plate 200 may be coupled and fixed to the battery case 800 in which the battery cells 100 are mounted as shown in FIG. 1. According to the embodiment, the first end plate 200 may be fixed to the battery case 800 by bolt-coupling. However, this is merely an embodiment, and when the first end plate 200 may be coupled to the battery case 800, the first end plate 200 may also be coupled to the battery case 800 by various coupling methods.

The second end plate 300 is located on an outer surface of the battery cell, i.e., a second battery cell, located on the other outermost side among the plurality of the battery cells 100. The second end plate 300 may support the battery cells 100 together with the first end plate 200. Furthermore, the second end plate 300 may be movable in a direction opposite to the first end plate 200 when the plurality of battery cells 100 is swollen. As used herein, the battery cell, including the plurality of cells 100, may swell if any one or more of the plurality of cells 100 swells. Each cell 100 need not be swollen but instead even one of the cells 100 being swollen can result in the battery cell, i.e., the plurality of battery cells 100, being swollen.

Specifically, as shown in FIGS. 1-6, the second end plate 300 may not be fixed to the battery case 800 or to a specific structure which is different from the first end plate 200. Accordingly, when the battery cells 100 are swollen due to charge/discharge or deterioration as shown in FIG. 6, the second end plate 300 may be moved in a direction in which the battery cells 100 are swollen, i.e., the direction opposite to the first end plate 200. In this case, the plurality of battery cells 100 is swollen bidirectionally, but the first end plate 200 is fixed and the second end plate 300 is not fixed. Thus, the battery cells 100 move in the direction opposite to the first end plate 200.

The support bar 400 is located between the first end plate 200 and the second end plate 300. The support bar 400 may be connected between the first end plate 200 and the second end plate 300. According to the embodiment, as shown in FIG. 1, the support bar 400 may be coupled between the first end plate 200 and the second end plate 300 by bolt-coupling. Furthermore, the support bar 400 includes an elastic body 430 provided at a center thereof. A load generated when the plurality of battery cells 100 is swollen may be absorbed through the elastic body 430. In addition, one or more support bars 400 may be provided between the first end plate 200 and the second end plate 300.

Specifically, as shown in FIGS. 2 and 3, the support bar 400 may include a fixed support bar 410, a movable support bar 420, and an elastic body 430.

More specifically, the fixed support bar 410 may include a first support bar 412 that has one side connected to the first end plate 200 and a first support bar head 414 formed on the other side of the first support bar 412.

Furthermore, the movable support bar 420 may include a second support bar 422 that has the other side connected to the second end plate 200 and a second support bar head 424 formed on one side of the second support bar 422.

Specifically, the second support bar head 424 has an accommodation space formed therein and has a cylindrical or polyprismatic cross section. According to the embodiment, as shown in FIG. 2, the second support bar head 424 may have a cylinder shape in which the accommodation space is famed. Furthermore, a first penetrating portion 425 through which the first support bar 412 penetrates may be formed on one surface of the second support bar head 424. A second penetrating portion 426 may be formed on at least one of a front surface or a rear surface of the second support bar head 424. In this embodiment, the second penetrating portion 426 may serve to easily check whether or not the elastic body 430 disposed in the accommodation space of the second support bar head 424 (described below) is normally assembled.

More specifically, the elastic body 430 that absorbs a load generated when the plurality of battery cells 100 is swollen and a part of the fixed support bar 410 may be disposed in the accommodation space of the second support bar head 424. According to the embodiment, the elastic body 430 may be a spring. However, this is merely an embodiment in a case where the elastic body may be accommodated in the second support bar head 424 and absorb a load generated when the battery cells 100 are swollen, various types of elastic bodies may be used in the present disclosure. In addition, the fact that a part of the fixed support bar 410 is accommodated or disposed in the accommodation space of the second support bar head 424 may mean that a part of the first support bar 412 and the first support bar head 414 are accommodated or disposed in the accommodation space, as shown in FIGS. 2 and 4.

On the other hand, as shown in FIG. 4, the elastic body 430 is located between one surface of the first support bar head 414 and one surface of the second support bar head 424. The elastic body 430 may be compressed as the movable support bar 420 moves when the battery cells 100 are swollen. Specifically, since the first support bar head 414 is connected to the first end plate 200 to which a fixed support bar 410 is fixed to the battery case 800, the first support bar head 414 may be fixed when the battery cell 100 is swollen. However, since the movable support bar 420 is not fixed to the second support head 424, the movable support bar 420 may be movable in the direction opposite to the first end plate 200 when the battery cell 100 is swollen. Accordingly, the elastic body 430 located between one surface of the first support bar head 414 and one surface of the second support bar head 424 may be extruded.

Thus, the elastic body 430 is compressed when the plurality of battery cells 100 is swollen as described above, to thereby absorb a load generated while the battery cells 100 are swollen. As a result, the initial surface pressure of each battery cell 100 is maintained even in a state in which the battery cell 100 is swollen to thereby improve life and durability of the battery cells 100.

The fixed bracket 600 may be coupled to the battery case 800 located over the movable bracket 500 and fastened to the movable bracket 500. Specifically, the fixed bracket 600 may include a second coupling portion 610 coupled to the battery case 800 and a plurality of slits 620 to which a fastening portion 520 of the movable bracket 500 is fastened. According to the embodiment, the fixed bracket 600 may be coupled and fixed to the battery case 800 by bolt-coupling through a second coupling portion 610. In addition, when the plurality of battery cells 100 is swollen, the fixed bracket 600 is fixed to the battery case 800 to thereby limit a movement of the movable bracket 500 in a direction other than a direction in which the battery cells 100 are swollen.

The movable bracket 500 is fixed to the movable support bar 420 and may be moved together as the movable support bar 420 moves when the battery cells 100 are swollen. Specifically, as shown in FIG. 5, the movable bracket 500 may include a first coupling portion 510 coupled to the movable support bar 420 and a plurality of fastening portions 520 fastened to the fixed bracket 600. According to the embodiment, the movable support bar 420 may be coupled to the first coupling portion 510 of the movable bracket 500 by welding.

On the other hand, the fastening portion 520 may include a protruding portion 521 that protrudes upward from a lower surface of the movable bracket 500 and an extending portion 522 bent at an end of the protruding portion 521. The extending portion 522 extends to the second end plate 300. In this case, a height of the protruding portion 521 is greater than a thickness of the fixed bracket 600. A width of the extending portion 522 may be formed to be smaller than a width of a silt 620 of the fixed bracket 600.

In other words, the width of the extending portion 522 is formed to be smaller than the width of the slit 620 such that the fastening portion 520 may be inserted into the slit 620. In addition, as the battery cell 100 is swollen and the movable support bar 420 moves, the movable bracket 500 moves together in a movement direction of the second end plate 300 by the width of the extending portion 522. After the movable bracket 500 moves in a certain distance, the protruding portion 521 is caught by the end of the slit 620, to thereby suppress the swelling of the battery cells 100 as much as possible by limiting the movement distance of the second end plate 300 when the battery cells 100 are swollen.

The pad 700 is disposed between the fixed bracket 600 and the movable bracket 500 and may serve to easily move the movable bracket 500 in the direction opposite to the first end plate 200 when the plurality of battery cells 100 is swollen. In this case, the pad 700 may be a low friction pad having a friction coefficient of a certain value or less.

FIG. 7 is a flowchart showing an operation flow of a battery module for a vehicle according to an embodiment of the present disclosure. As shown in FIG. 7, in the battery module for a vehicle according to the present disclosure, when the swelling occurs in the battery cells 100, the second end plate 300 and the movable support bar 420 move in the direction opposite to the first end plate 200. The elastic body 430 accommodated or disposed in the movable support bar 420 is compressed to absorb a load generated when the battery cells are swollen to thereby maintain the initial surface pressure applied to the battery cells 100 even when the swelling occurs in the battery cells 100. In addition, when shrinkage of the battery cells 100 occurs, a compressive load of the elastic body 430 accommodated or disposed in the movable support bar 420 is removed such that the movable support bar 420 and the second end plate 300 may be returned to an initial position.

According to the present disclosure, the elastic body of the support bar is compressed when the battery cell is swollen to thereby absorb a load generated while the battery cell is swollen. As a result, even in a state in which the battery cell is swollen, an initial surface pressure of each battery cell is maintained to thereby improve life and durability of the battery cell.

Although the present disclosure has been shown and described with respect to specific embodiments, it should be apparent to those having ordinary skill in the art that the present disclosure may be variously modified and altered without departing from the spirit and scope of the present disclosure as defined by the following claims.

What is claimed is:

1. A battery module for a vehicle, the battery module comprising:
   a plurality of battery cells, which are stacked;
   a first end plate located on an outer surface of a first battery cell located on one outermost side among the plurality of battery cells;
   a second end plate located on an outer surface of a second battery cell located on the other outermost side among the plurality of battery cells;
   one or more support bars located between the first and second end plates, connecting the first and second end plates to each other, including an elastic body, and absorbing a load generated when the plurality of battery cells is swollen,
   wherein the one or more support bars comprise
      a fixed support bar including a first support bar having one side connected to the first end plate and a first support bar head formed on the other side of the first support bar, and a movable support bar including a second support bar having the other side connected to the second end plate and a second support bar head formed on one side of the second support bar.

2. The battery module of claim 1, further comprising:
a battery case in which the plurality of battery cells is mounted, wherein
the first end plate is coupled and fixed to the battery case, and
the second end plate is movable in a direction opposite to the first end plate when the plurality of battery cells is swollen.

3. The battery module of claim 1, wherein the second support bar head has an accommodation space formed therein and has a cylindrical or polyprismatic cross section, a first penetrating portion protruding the first support bar is formed on one surface of the second support bar head, and a second penetrating portion is formed on at least one of a front surface and a rear surface of the second support bar head.

4. The battery module of claim 3, wherein
a part of the elastic body and the fixed support bar are disposed in the accommodation space of the second support bar head, the elastic body absorbing a load generated when the plurality of battery cells is swollen, and
the elastic body is located between the first support bar head and one surface of the second support bar head and compressed as the movable support bar moves when the plurality of battery cells is swollen.

5. The battery module of claim 1, further comprising:
a movable bracket coupled to the movable support bar and being movable as the movable support bar moves when the plurality of battery cells is swollen;
a fixed bracket being located over the movable bracket, fastened to the movable bracket, and limiting a movement of the movable bracket in a direction other than a direction in which the plurality of battery cells is swollen; and
a pad disposed between the fixed bracket and the movable bracket and having a friction coefficient of a certain value or less.

6. The battery module of claim 5, wherein
the movable bracket includes a first coupling portion coupled to the movable support bar and a plurality of fastening portions fastened to the fixed bracket, and
the fixed bracket includes a second coupling portion coupled to the battery case and a plurality of slits to which the plurality of fastening portions is fastened.

7. The battery module of claim 6, wherein each of the plurality of fastening portions includes a protruding portion protruding upward from a lower surface of the movable bracket and an extending portion bent at an end of the protruding portion and extending to the second end plate.

8. The battery module of claim 7, wherein a height of the protruding portion is greater than a thickness of the fixed bracket, and a width of the extending portion is formed to be smaller than a width of a respective slit of the plurality of slits.

* * * * *